United States Patent [19]
Hughes

[11] Patent Number: 5,514,009
[45] Date of Patent: May 7, 1996

[54] WIRING HARNESS ADAPTER AND METHOD AND APPARATUS FOR FABRICATING THE SAME

[76] Inventor: Michael T. Hughes, 504 Second St., P.O. Box 1379, Berthoud, Colo. 80513

[21] Appl. No.: 480,950

[22] Filed: Jun. 7, 1995

Related U.S. Application Data

[63] Continuation of Ser. No. 319,636, Oct. 7, 1994, abandoned, which is a continuation of Ser. No. 143,655, Nov. 1, 1993, Pat. No. 5,354,204, which is a continuation of Ser. No. 920,835, Jul. 28, 1992, abandoned.

[51] Int. Cl.$^6$ .................................................. H01R 23/02
[52] U.S. Cl. ............................................ 439/35; 439/653
[58] Field of Search ........................... 439/35, 638, 650, 439/651, 653, 654, 678

[56] References Cited

U.S. PATENT DOCUMENTS

| | | | |
|---|---|---|---|
| D. 249,502 | 9/1978 | Rink et al. | D13/24 |
| 4,460,811 | 7/1984 | Murr et al. | 200/51.03 |
| 4,718,853 | 1/1988 | Orbanic | 439/35 |
| 4,770,644 | 9/1988 | Feder | 439/166 |
| 4,781,393 | 11/1988 | Jeter | 280/422 |
| 4,842,524 | 6/1989 | Hopkins et al. | 439/35 |
| 4,846,697 | 7/1989 | Rodgers | 439/35 |
| 5,030,938 | 7/1991 | Bondzeit | 340/431 |
| 5,052,951 | 10/1991 | Johnson | 439/723 |
| 5,184,960 | 2/1993 | Hopkins et al. | 439/35 |

FOREIGN PATENT DOCUMENTS

| | | |
|---|---|---|
| 1510090 | 1/1968 | France . |
| 1929470 | 2/1970 | Germany . |
| 2819971 | 11/1979 | Germany . |

OTHER PUBLICATIONS

Exhibits A & B of Custom Towing Mirror Ltd. literature.
Advertisement, West Marine Products, 1984.
Advertisement, Marine Buyer's Guide, 1984.
Two photographs and one photocopy of a wiring harness adapter.
Drawing, "Connector Adapter", C.S. 7010, dated Feb. 6, 1989.
Drawing, "Connector Adapter", C.S. 7012, dated Feb. 7, 1989.

*Primary Examiner*—Gary F. Pauman
*Attorney, Agent, or Firm*—Dinnin & Dunn

[57] ABSTRACT

A plurality of adapter embodiments connect the electrical system of a first vehicle to the electrical system of a second vehicle, such as a vehicle in tow. The adapters have particular application for mating a four-way-flat harness connector of a trailer at one end, and at other opposite end, for mating a complex round harness connector with numerous terminals. The adapters are solid unitary structures formed with a covering material. Adapter molds are provided for fabricating the adapters. The molds include a series of interchangeable, removable mold inserts received within the mold body. Depressions are formed in the removable mold inserts in a configuration corresponding approximately to the shape of the adapter. The covering material is injected into the mold to thereby form the adapters.

2 Claims, 7 Drawing Sheets

WIRING HARNESS ADAPTER AND METHOD AND APPARATUS FOR FABRICATING THE SAME

This is a Continuation of U.S. patent application Ser. No. 08/319,636 filed Oct. 7, 1994, now abandoned, which is a Continuation of U.S. patent application Ser. No. 08/143,655 filed Nov. 1, 1993, now U.S. Pat. No. 5,354,204, which is a Continuation of U.S. patent application Ser. No. 07/920,835 filed Jul. 28, 1992, now abandoned.

FIELD OF THE INVENTION

The present invention generally relates to wiring interfaces for electrically coupling electrical systems disposed on separate vehicles. More particularly, the present invention relates to wiring harness adapters and related methods for connecting a first wiring harness of a first vehicle to a second wiring harness of a second vehicle to thereby interface their respective electrical systems.

BACKGROUND OF THE INVENTION

In recent years, the rising popularity of outdoor recreational activities, such as boating and camping, has lead to an increase in the use of trailers, campers, and other towed vehicles. Moreover, many state and federal laws require that towed vehicles, such as trailers, have complete on-board electrical systems for providing, for instance, brake lights, turn signals, and other electrical functionality. These complete on-board electrical systems are usually controlled by the electrical system of the towing vehicle in a master-servant relationship. For example, a driver of the towing vehicle can operate the lights of the towed vehicle by merely controlling the lighting system of the towing vehicle.

Generally, a hard-wired electrical connection is implemented to interface the electrical systems of the vehicles. Hard-wired electrical connections are typically implemented via respective wiring harnesses disposed on the vehicles. Each of the wiring harnesses-have harness connectors with female and/or male terminals in a pin and/or blade configuration in order to establish an electrical interconnection between the wiring harnesses. The towed vehicle usually comprises an array of male pin for insertion into an array of female pin terminals associated with the wiring harness of the towing vehicle.

Early wiring harnesses comprised relatively simple harness connectors having four terminals arranged in a linear manner in a flat configuration. Consequently, these four-terminal harness connectors are commonly known as "four-way-flat" harness connectors. Further, these four-terminal harness connectors were usually sufficient for handling low current requirements of simple electrical systems providing for signal lights, for example, brake lights, parking lights, a left turn signal light, and a right turn signal light.

However, trailers, campers, and other towed vehicles are rapidly evolving and are becoming more sophisticated and larger in size. The newer towed vehicles are equipped with a multitude of more complex accessories, such as electric braking systems, separate air conditioners, stove, and refrigerators. These accessories require higher electrical currents and power, which necessitate heavier and a greater number of interconnections. Today, harness connectors having six or seven wires are becoming increasingly more common on towing vehicles. As a result, the terminals in harness connectors are being arranged in a circular configuration resulting in a round connector end, instead of in a flat configuration, in order to conserve space. The foregoing harness connectors are known in the art as a "six-way-round" harness connector and "seven-way-round" harness connector. Moreover, these harness connectors are being configured with pin and/or blade as well as male and/or female terminals.

However, the implementation of more complex harness connectors having a greater number of terminals is problematic. Over eighty five percent (85%) of conventional trailers in use today still use a four-terminal harness connector. This includes the majority of commercial rental trailers, as well as all other trailers and towed vehicles that include only an operating lighting system and none of the aforementioned accessories. Consequently, in order to interface these conventional trailers with the electrical system of a newer towing vehicle, the more complex harness connector of the towing vehicle having a multiplicity of terminals must be replaced, modified, or bypassed in some manner. Furthermore, replacing the more complex harness connector with a simple four-way harness connector is undesirable because the procedure is expensive and permanently prevents future use of the more complex harness connector with a more sophisticated trailer having a cooperating complex harness connector.

In a conventional modification technique, a pinch-type clamp connector is squeezed directly over the wires of the electrical system associated with the towing vehicle. The clamp connector is intended to cut through the insulation of the wires to establish an electrical connection. Over time, however, the clamp connectors can cut through or cause the wires to break, thereby damaging the electrical system and requiring repair.

In a conventional bypass technique, the light covers are first removed from the tail lights of the towing vehicle. Then, electrical connections are made via the light bulb sockets. Needless to say, this juryrigging arrangement is aesthetically unsightly. Further, this arrangement often destroys the water seal around the light covers, which can undesirably lead to damage to the sockets and electrical system. Finally, as the vehicles move through a turn, the wires tend to pull against the lens covers, thereby damaging the lens covers.

Accordingly, a heretofore unaddressed need exists in the industry for a means and method of interfacing the various types of more complex harness connectors provided by newer towing vehicles with the simple four-terminal harness connectors found on older towed vehicles, such as trailers, campers, or the like, without requiring total permanent replacement of the harness connector on the towing vehicle and without requiring a Juryrigged connection to the harness connector or associated electrical system.

SUMMARY OF THE INVENTION

Briefly described, the present invention comprises a method and apparatus for interfacing an electrical system of a first vehicle to an electrical system of a second vehicle, such as a vehicle in tow. To provide this interfacing, novel unitary wiring harness adapter is fabricated using novel methods and apparatuses, as described herein. In essence, the unitary wiring harness adapter couples the wiring harness connectors of the respective vehicle.

The unitary adapter has a unitary adapter body having a first end spaced from a second end. The first end has a plurality of first adapter terminals adapted to engage a plurality of first harness terminals on the first harness connector in mating engagement. The second end has a plurality of second adapter terminals on the second harness connector. A plurality of twisted interconnect wires extends through and is encapsulated by the adapter body between the first and second adapter terminals for electrically interfacing a first electrical system of the first vehicle with a second electrical system of the second vehicle.

The mold for forming the adapter includes two mold halves which are coupled together to form a mold. Each mold half has a pair of opposing end cavities and an intermediate cavity positioned between the two end cavities. The intermediate mold inserts define indentations or cut-outs within their upper surfaces. The shape of the indentations and cut-outs formed in the intermediate mold inserts corresponds substantially to the shape and configuration of the adapter to be formed. An injector port is defined in the mold adjacent one of the intermediate mold inserts. The injection port includes an outlet formed in the intermediate mold insert for the injection of covering material into the mold.

A pair of removable end mold inserts are adapted to be received within the end cavities of the mold, adjacent the intermediate mold inserts. Each of the end mold inserts is a substantially square-shaped block having a series of posts projecting from their respective front surfaces. A first removable end mold insert includes six to seven posts arranged in a substantially circular pattern corresponding to the pattern of the female terminals to be formed in the round end portion of the adapter. The other removable end mold insert includes a series of approximately three posts aligned horizontally, and a socket positioned adjacent the horizontally aligned post.

Interconnect wires are extended between the removable end mold inserts, with the ends of the interconnect wires being attached to the posts mounted to front surfaces of the end mold inserts. The interconnect wires each include terminal contacts secured to their opposite ends. The terminal contacts slidably engage the posts and/or sockets of the end mold inserts to thereby attach the interconnect wires to the end mold inserts. Once the interconnect wires have been attached to the posts and/or socket of both end mold inserts, the end mold inserts are rotated or turned in opposite directions of rotation with respect to one another so that the interconnect wires are twisted or wrapped about each other.

The end mold inserts thereafter are inserted into the end cavities positioned on each side of the intermediate cavity of a mold half. The end mold inserts are positioned in the end cavities, with the end mold inserts facing each other and the interconnect wires extending between the end mold inserts along the indentations or cut-outs formed in the upper surfaces of the intermediate mold inserts. A set of approximately four wire guide pins are mounted to the upper surface of one of the intermediate mold inserts and spaced apart from one another. The wire guide pins engage and support the interconnect wires during the molding process to prevent the interconnect wires from contacting or being pressed against the sides of the intermediate mold inserts. The twisting of the interconnect wire assists in engaging the interconnect wires together, and positioning the interconnect wires against the guide pins.

Once the end mold inserts have been positioned within the mold half, the mold half is coupled to another mold half which is symmetrical in structure to the foregoing mold half, and covering material is introduced into the mold. In the preferred embodiment, covering material is injected under pressures of up to approximately 15,000 pounds per square inch (psi) into the mold. The covering material fills the indentation and cut-out portions formed in the upper surfaces of the intermediate mold inserts, and also fills the cavities defined by the mold end portions, flowing about and encapsulating the interconnect wires. Thereafter, the covering material is cooled and dried. The covering material hardens into a solid unitary adapter having adapter connectors formed at each end for interfacing with the respective harness connectors of the vehicles.

Each individual intermediate and end mold insert is removable and replaceable within the intermediate and end cavities of the mold. Thus, mold inserts having differing cut-out configurations can be interchangeably inserted into the intermediate and end cavities of the mold to form adapters having differing adapter connector configurations.

Accordingly, an object of the present invention is provide a harness adapter and method for interfacing a first harness connector of a first vehicle to a second harness connector of a second vehicle.

Another object of the present invention is to provide an adapter and method for interfacing an electrical system of a towing vehicle and an electrical system of a towed vehicle.

Another object of the present invention is to provide an adapter and method for interfacing the various types of more complex harness connectors provided by newer towing vehicles with the simple four-terminal harness connectors found on older towed vehicles without requiring total permanent replacement of the harness connector on the towing vehicle and without requiring a juryrigged connection to the harness connector or associated electrical system.

Another object of the present invention is to provide an adapter for interfacing harness connectors which is durable in design and reliable in operation.

Another object of the present invention is to provide a method and apparatus for fabricating a solid unitary adapter for interfacing a first harness connector of a first vehicle to a second harness connector of a second vehicle.

Another object of the present invention is to provide a mold having interchangeable mold inserts that are removably received within a mold body for fabricating solid unitary adapters of different configurations.

Another object of the present invention is to provide a method and apparatus for quickly, economically, and efficiently fabricating an adapter for interfacing an electrical system of a first vehicle with that of a second vehicle.

Other objects, features, and advantages of the present invention will become apparent from the following detailed description when taken into conjunction with the accompanying drawings in which like characters of reference designate corresponding parts throughout the serveral views.

BRIEF DESCRIPTION OF THE DRAWINGS

The present invention, as defined in the claims, can be better understood with reference to the following drawings. The drawings are not necessarily to scale, emphasis instead being place upon clearly illustrating principles of the present invention.

DETAILED DESCRIPTION OF THE PREFERRED EMBODIMENT

Figure 1A:
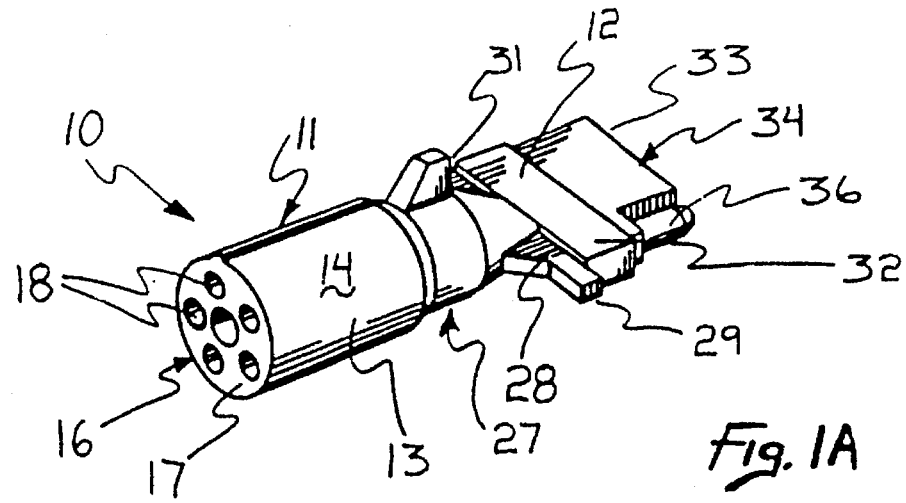
FIG. 1A is a perspective view of a first embodiment of an adapter in accordance with the present invention for interfacing a pentagon configured, six-way-round harness connector with a four-way-flat harness connector.
Figure 1B:
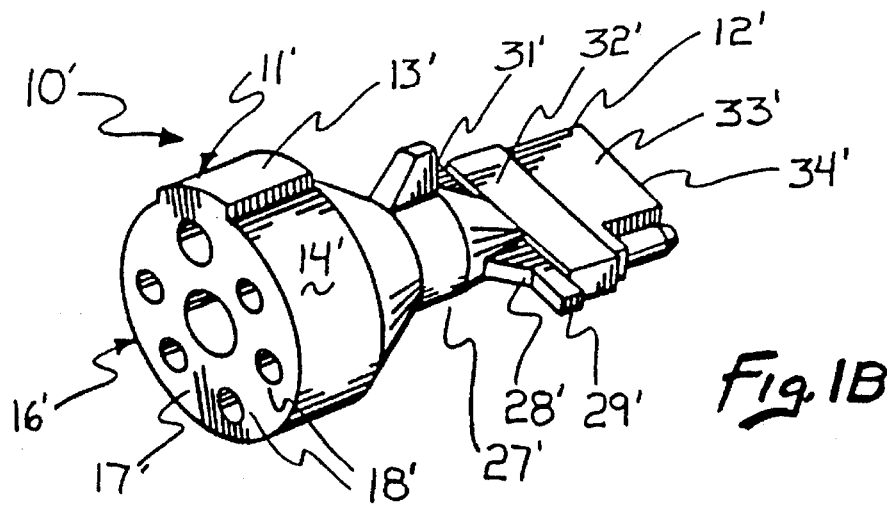
FIG. 1B is a perspective view of a second embodiment of an adapter in accordance with the present invention for connecting a hexagon configured, seven-way-round harness connector to a four-way-flat harness connector.
Figure 1C:
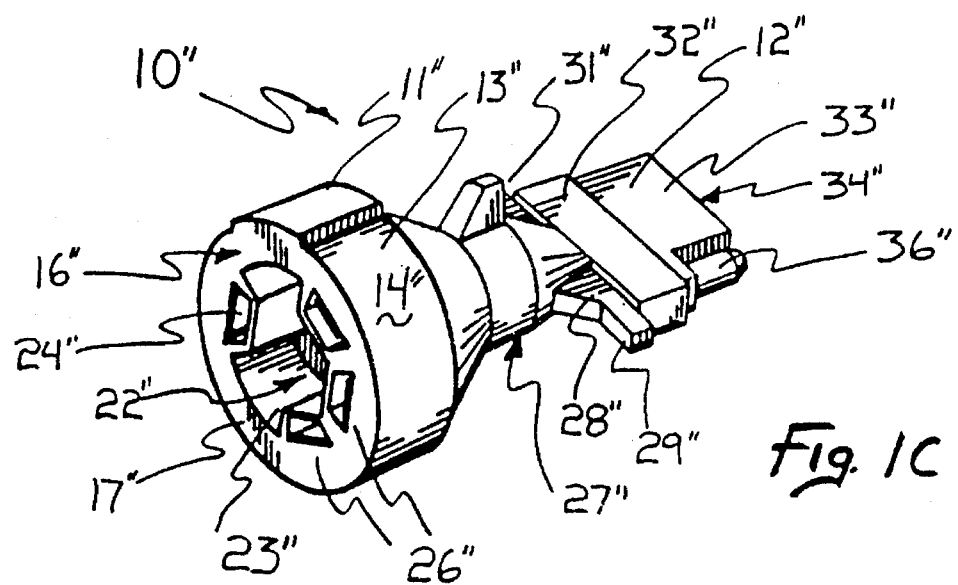
FIG. 1C is a perspective view of a third embodiment of an adapter in accordance with the present invention for connecting a hexagon configured, seven-way-round harness connector to a four-way-flat harness connector.

Referring now to the drawings in which like numerals indicate corresponding parts throughout the several views, FIGS. 1A, 1B, and 1C illustrate respectively first, second, and third embodiments of a novel adapter for interfacing a first electrical system of a first vehicle (not shown) with a second electrical system of a second vehicle (not shown). The first vehicle has a complex harness connector having a large number and variety of harness terminals, whereas the second vehicle comprises a conventional four-way-flat harness connector. Each adapter 10, 10', 10" of respective FIGS. 1A, 1B, and 1C is a durable unitary structure formed from a resin, plastic, rubber, or other suitable material for the purposes described herein. Moreover, a series of four interconnect wires, described and shown in figures hereafter, extend longitudinally through the various adapters 10, 10', 10' for transmission of electrical signals between the first vehicle and the second vehicle.

As shown in FIG. 1A, the adapter 10 includes an adapter body having first and second ends 11, 12 with the first end being a substantially cylindrical, round terminal housing 13 sized and adapted to engage and mate with a first harness connector (not shown) of the first vehicle. The specific size of the round terminal housing 13 is determined by the first harness connector. The round terminal housing 13 includes a cylindrical side wall 14 with a free end 16 having a flat side surface 17.

As illustrated in respective FIGS. 1A, 1B, a plurality of cylinder-like, female pin terminals 18, 18' are formed in a substantially polygon pattern in the flat side surface 17, 17' of the free end 16, 16' of the round terminal housing 13, 13'. The female pin terminals 18, 18' are each sized to receive a protruding male pin terminal contact (not shown) of the harness connector associated with the first vehicle. It should be noted that the arragement, shape, and number of adapter terminals 18, 18' depend upon the type of harness connector with which the adapter is designed to mate. For example, FIG. 1A illustrates an adapter 10 for mating with a pentagon configured, six-way-round harness connector, while FIG. 1B illustrates an adapter 10' for mating with a hexagon configured, seven way-round harness connector.

FIG. 1C illustrates an adapter 10" having a round terminal housing 13" at its insert end for mating with a seven-way-round harness connector. The round terminal housing 13" of adapter 10" has a substantially conical shaped configuration having an internal cavity 22" at its free end 16". The cavity 22" has a substantially cylindrial side wall 23" about which a series of female blade terminals configured to form four sides of a hexagon 24" are positioned. As shown in FIG. 1C, the female blade terminals 24" comprise corresponding flat blade terminal contacts 26" therein for contacting a blade terminal contact of a hexagon configured, harness connector (not shown) to thereby effectuate an electrical interface.

Furthermore, in regard to FIG. 1A through 1C, each of the adapters 10, 10', 10" has an intermediate portion 27 extending away from the round terminal housing 13, 13', 13", tapering inwardly from the first end 11, 11', 11" toward the second end 12, 12', 12". The intermediate portion 27 tapers to a substantially flat rectangular section 28 having a pair of outwardly flared flanges 29, 31, thus forming a substantially T-shaped configuration. The flanges 29, 31 act as finger grips for gripping and holding the adapters 10, 10', 10" when engaging it with the harness connectors of the vehicles. A rectangular flat terminal housing 32 is formed at the end of the intermediate portion 27. The flat terminal housing 32 includes a free end 33 having a substantially flat end surface 34. A male pin terminal 36 and a series of three female pin terminals (not shown) are formed in the flat side surface 34 for receiving the male pin terminals of a wiring harness of the second vehicle, such as a trailer. As a result of the foregoing configuration, the adapters 10, 10', 10" can be quickly and easily installed between a first vehicle and second vehicle to interface their respective electrical systems.

Figure 2:
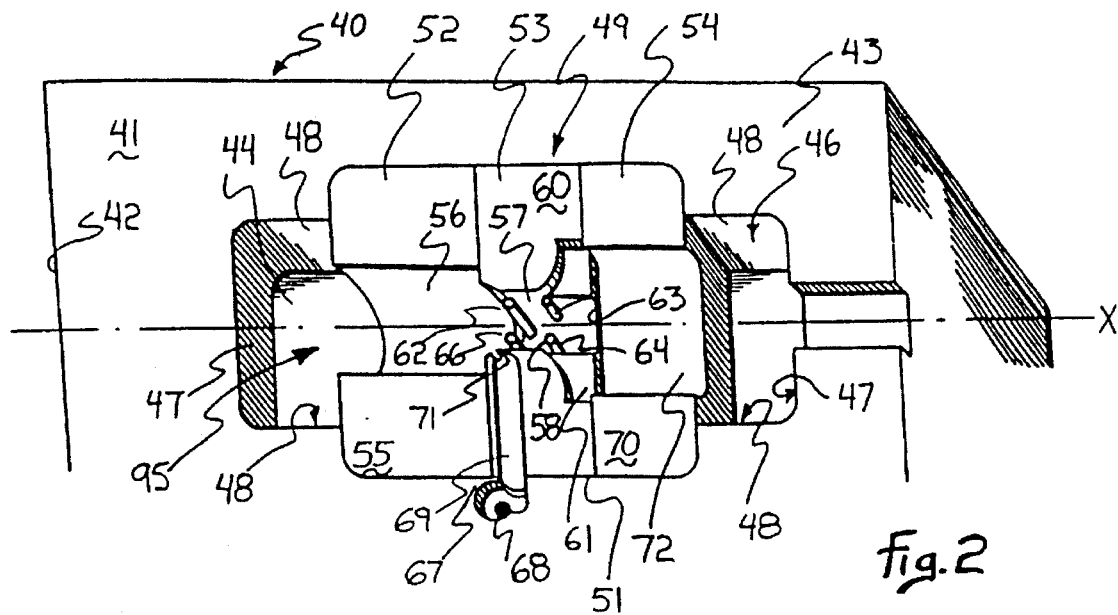
FIG. 2 is a perspective view of a first embodiment of a mold half in accordance with the present invention with mold inserts for forming the novel adapters of FIGS. 1A through 1C.

FIG. 2 illustrates in a cross-sectional view of a mold half 40 for forming the solid unitary adapters 10, 10', 10" of respective FIGS. 1A, 1B, 1C. The other half of the novel mold is not shown for simplicity, but comprises the same features of the mold half 40 described hereafter and is engaged against the mold half 40, as is well known in the art. With reference to FIG. 2, the mold half 40 includes a substantially rectangular mold body 41 having a first end 42 and a second end 43 arranged along a longitudinal axis X. The mold body 41 is formed from a metal and/or a polymer material, such as a high strength resin or plastic, having preferably a substantially smooth non-stick surface.

The mold body 41 includes a pair of end cavities 44, 46 formed adjacent the first and second ends 42, 43 respectively. The end cavities are substantially square-shaped receptacles having end walls 47 and side walls 48. An intermediate cavity 49 is formed along longitudinal axis X between the end cavities 44 and 46. As FIG. 2 illustrates, the intermediate cavity 49 is an approximately rectangularly shaped, open ended cavity of a length and width substantially greater than that of the end cavities and includes side walls 51 extending parallel to longitudinal axis X. The intermediate cavity is sized to releasably receive a series of intermediate mold inserts 52, 53, 54 therein.

A first intermediate mold insert 52 is a rectangularly-shaped block formed from the same type of high strength plastic or metal having preferably a non-stick upper surface 55 and is releasably received between the side walls 51 and the intermediate cavity adjacent the first end cavity 44. A semi-cylindrical channel or depression 56 is formed within the upper surface 55 of the first intermediate mold insert 52. The depression 56 is aligned with and extends along the longitudinal axis X. The depression size and shape are determined by the size and shape of the particular round terminal housing 13, 13', 13" to be formed on the respective adapters 10, 10', 10".

As further shown in FIG. 2, a second intermediate mold insert 53 is positioned within the intermediate cavity 49 immediately adjacent the first intermediate mold insert 52 and engaging the side walls 51. The second intermediate mold insert is a substantially rectangular block formed from the same high strength resin, plastic, or metal to form the first intermediate mold insert having a non-stick upper surface 60. A cut-out 57 is formed in the upper surface 60 (aligned with the longitudinal axis X) of the second intermediate mold insert. The cut-out 57 includes a semi-cylindrical channel 58 aligned with the semi-cylindrical channel 56 of the first intermediate mold insert 53. The semi-cylindrical channel 58 is of a reduced diameter than that of the semi-cylindrical channel 56 and is aligned with longitudinal axis X. The cut-out 57 further includes outwardly flaring side portions 59 and 61 projecting laterally from a semi-cylindrical channel. The cut-out 57 thus has a substantially T-shaped configuration which corresponds to the shape of the intermediate portion 27, 27', 27" of the respective adapter 10, 10', 10".

A series of four wire guide pins 62, 63, 64, 66 are mounted to the upper surface 60 of the second intermediate mold insert 53. These wire guide pins 62, 63, 64, 66 are positioned along the semi-cylindrical channel 58 in a spaced relationship from one another. An additional pair of wire guide pins (not shown) can be utilized if necessary, positioned between wire guide pins 62 and 63, adjacent the semi-cylindrical channel 56 of the first intermediate mold insert 52.

An injection port 67 is formed adjacent the second intermediate mold insert. The injection port 67 comprises a hollow supply tube 68 formed through the mold body 41 and through which the extrusion or covering material to be injected into the mold is introduced. The covering material may be introduced in a variety of manners. It may be introduced, for example, under pressure via any conventional injection molding process or, as another example, it may be introduced via any conventional casting process.

An extrusion channel 69 is formed through the second intermediate mold insert adjacent semicylindrical channel 58 for the purpose of receiving the adapter covering material. The extrusion channel 69 extends from the supply tube 68 along the width of the second intermediate mold insert, terminating adjacent the side wall of the semi-cylindrical channel 58. An outlet 71 is formed in the side wall of the semi-cylindrical channel 58 at the end of extrusion channel to enable the covering material to be injected into the mold body.

A third intermediate mold insert 54 is positioned within the intermediate cavity 47 between the second end cavity 46 and the second intermediate mold insert 53. The third intermediate mold insert 54 is a substantially rectangular block formed from the same high-strength plastic or metal from which the first and second intermediate mold inserts and the mold body are formed, having a substantially non-stick upper surface 70. The third intermediate mold insert includes a substantially rectangularly shaped flat cut-out 72 formed in its upper surface 70 along longitudinal axis X. The flat cut-out 72 is aligned with the flared side portions 59 and 61 of the second intermediate mold insert. The shape of the flat cut-out 72 corresponds approximately to the flat terminal housing 32 of FIGS. 1A, 1B, 1C at the second ends 12, 12', 12" of the respective adapters 10, 10', 10".

When the mold half 40 is coupled to a similar mold half having similar structure as described previously, the alignment of the aforementioned channels and cut-outs in the first, second, and third intermediate mold inserts form the outline of the adapter 10, 10', 10". The first, second, and third intermediate mold inserts are generally not removed during the molding process when the mold halves are coupled and decoupled, but instead are left in position in the respective mold halves. The intermediate mold inserts can, however, be easily removed from the intermediate cavity as required for replacement due to, for instance, damage or a desire to form different adapter molds.

Figure 3A:
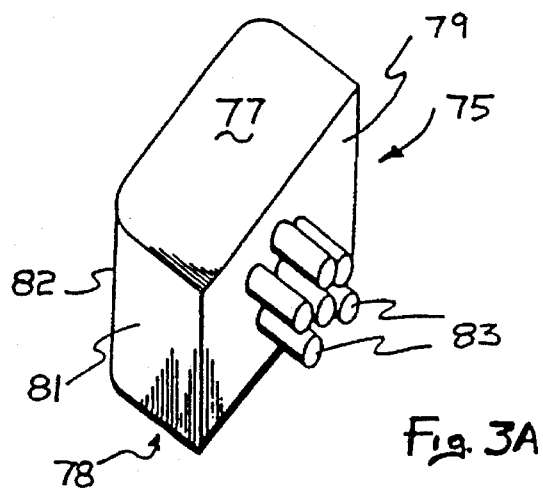
FIGS. 3A and 3B are perspective views of a correlative set of end mold inserts used for fabricating the novel adapter of FIG. 1A.
Figure 3B:
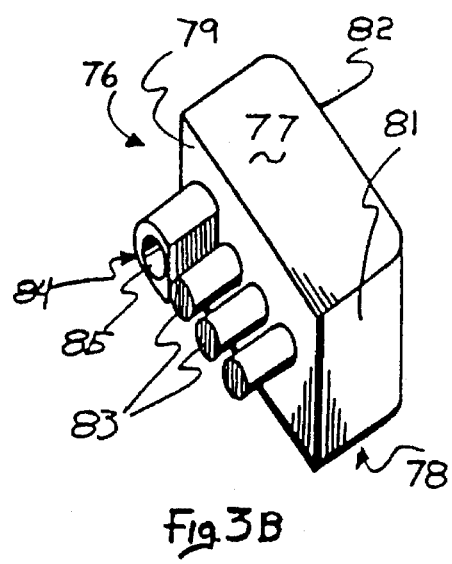

FIGS. 3A and 3B illustrate a correlative set of removable end mold inserts 75, 76, respectively, which are sized to snugly fit within the corresponding end cavities 44, 46 of FIG. 2. As shown in FIG. 3A, the end mold inserts 75, 76 are each a substantially rectangular block formed from the same high strength resin, plastic, or metal material from which the intermediate mold inserts and the mold body 41 are formed. Each end mold insert 75, 76 has an upper surface 77, lower surface 78, front surface 79, side surfaces 81, and a rear surface 82. A series of connecting posts 83 are attached to the front surface 79 of each end mold insert 75, 76 and project outwardly therefrom. The connecting posts 83 support metal contacts for forming female pin terminals during the molding process.

The connector posts 83 are typically cylindrically shaped cores, as illustrated in FIGS. 3A and 3B, and are arranged in a desired configuration according to the specific type of harness connector to be engaged by the subject adapter. For example, end mold insert 76, which is adapted to be received within end cavity 46 of FIG. 2, has a series of three laterally aligned spaced apart connector posts 83 for forming the terminals to be interfaced to the conventional four-way-flat harness connector. Moreover, end mold insert 76 further includes a socket 84 having a bore 85 formed therein and aligned horizontally with the connector posts 83. The bore 85 forms the male pin terminal contact 36 to be interfaced with the conventional four-way-flat harness connector. Furthermore, removable mold insert 75 includes a series of six connector posts 83 arranged in a substantially circular pattern corresponding to the configuration of the male pin terminals of the conventional six-way-round harness connector.

Figure 3C:
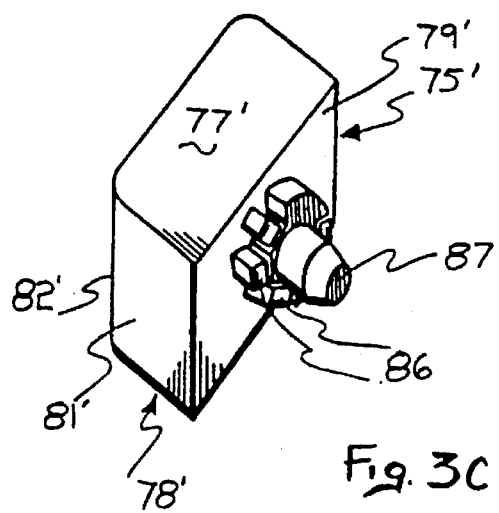
FIG. 3C is a perspective view of an alternative embodiment of the end mold insert if FIG. 3A for the purpose of fabricating the novel adapter of FIG. 1C.

FIG. 3C illustrates an alternative embodiment of the end mold insert 75 of FIG. 3A. The end mold insert 75' is used for fabricating the adapter 10" of FIG. 1C. As shown in FIG. 3C, the end mold insert 75' has a series of sockets 86 each including a blade termination core 87 mounted therein. The sockets 86 are arranged on the front surface 79' of end mold insert 75' in a circular pattern corresponding approximately to the seven-way-round harness connector. The correlative end mold insert (not shown) which engages the end mold insert 75' has preferably the same construction as the end mold insert 76.

Figure 4:
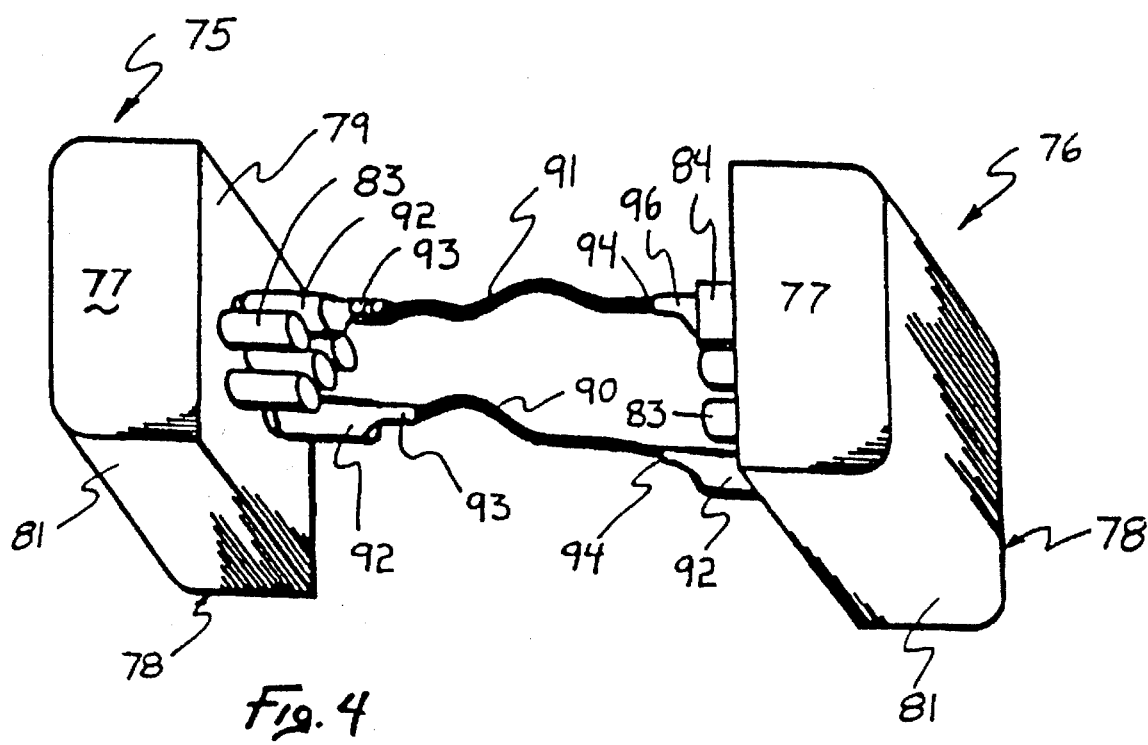
FIG. 4 is a perspective view of a pair of end mold inserts with interconnect wires extending therebetween and attached to the respective posts of the inserts.
Figure 5:
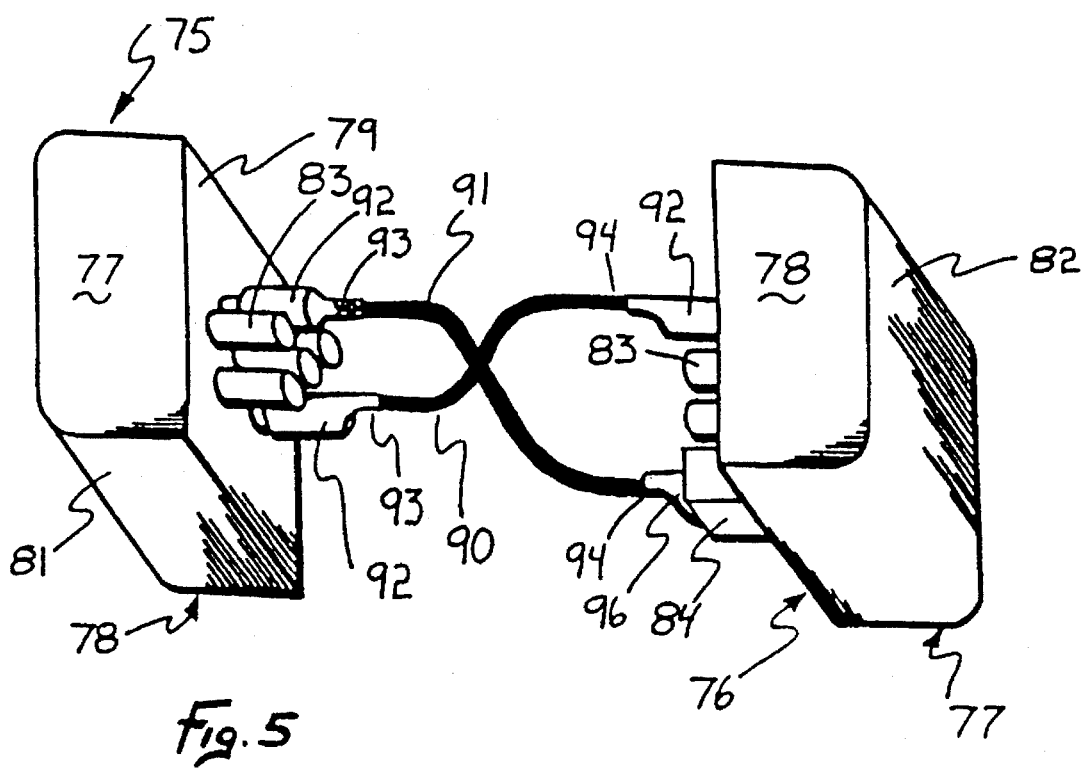
FIG. 5 is a perspective view of the mold inserts of FIG. 4 with the interconnect wires attached to and extending therebetween and with the interconnect wires twisted about one another.

In order to clearly describe the use of correlative sets of the end mold inserts, the manipulation of the end mold inserts 75, 76 are described hereafter, as an example, with an understanding that the procedure is applicable to all correlative sets in accordance with the present invention. As illustrated in FIGS. 4 and 5, interconnect wires 90, 91, for example, are extended between the end mold inserts 75, 76. An interconnect wire 90 is shown connected between a connector post on each of end mold inserts 75, 76. An interconnect wire 91 is shown connected to the connector post 83 of the end mold insert 75 and inserted into the bore 85 of end mold insert 76. The interconnect wires are preferably 16–18 gauge electrical wiring. It should be understood that while only two interconnect wires 90, 91 are illustrated by way of example, a total of four interconnect wires extending between the end mold insert 76 and end mold insert 76 are preferably utilized.

If it is desired to have less than four interconnect wires, then the remaining connector posts of end mold inserts 75, 76 which remain unattached to an interconnect wire, act as dummy posts to simply form blank apertures in the respective adapter 10, 10', 10". These blank apertures are able to receive the additional male pin terminal contacts of a harness connector, which ensures proper mating engagement of the adapter 10, 10', 10" with the harness connector.

Metal female pin terminal contacts 92 are attached to the opposite ends of the interconnect wire 90 as by soldering. The female pin terminal contacts 92 are substantially cylinder-shaped sleeves that slidably engage and fit about the male pin terminal contacts. As further shown, a male pin terminal contact is formed at one end 94 of interconnect wire 91. The male pin terminal contact 96 engages the socket 84 of end mold insert 76. The male pin terminal contact 96 is received within the bore of the socket 84 in mating engagement to secure the end 94 of the interconnect wire 91 within the socket 84 of end mold insert 76.

Figure 6:
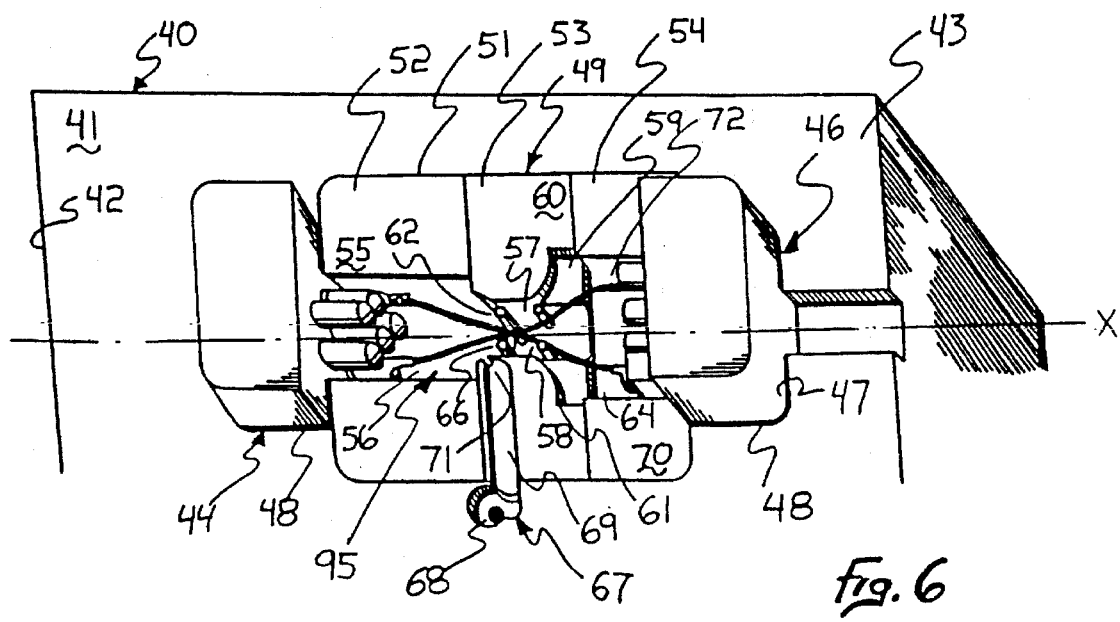
FIG. 6 is a perspective view of the mold showing the end mold inserts positioned within the end cavities of the mold with the interconnect wires extending along the longitudinal axis of the mold between the mold inserts.

During operation of the mold half 40 for fabricating the solid unitary adapter 10, 10', 10" of respective FIGS. 1A, 1B and 1C, a series of selected mold inserts are inserted into the mold body 40. These mold inserts include intermediate mold inserts 52, 53, 54 of FIG. 2 which are inserted between the side walls 51 of intermediate mold cavity 49 engaging the side walls of the intermediate cavity in a snug frictional fit. End mold inserts 75, 76 of FIGS. 4, 5 and 6 are inserted into the end cavities 44 and 46 at the first and second ends 42 and 43 of the mold body 41, adjacent mold inserts 52 and 54, respectively.

As shown in FIG. 2, the intermediate mold inserts 52, 53, 54 have channels and cut-out portions 56, 57, 72 formed therein in their upper surfaces oriented along longitudinal axis X. The configuration of the channels and cut-out portions of each of the intermediate mold inserts forms a cavity 95 within the mold body 41 that corresponds approximately to the shape of the desired adapter 10, 10', 10". For example, when forming a six-way-round to four-way-flat adapter, as shown in FIG. 1A, the channel 56 formed in intermediate mold insert 52 is a relatively shallow, semi-cylindrical depression approximately corresponding to the shape of the round terminal housing 13 of adapter 10, and end mold insert 75 of FIGS. 3A, 4, 5 includes a series of six cylindrical connector posts 83 formed in a circular pattern from its front surface 79 in a pattern corresponding to the pattern of the female pin terminals 18 of FIG. 1A formed in the flat surface 17 of the free end 16 of the cylindrical end round terminal housing of the adapter.

Referring back to FIG. 4, interconnect wires 90, 91 are extended between the mold inserts 75, 76. The interconnect wires 90, 91 each have female terminal contacts mounted to their opposite ends 93, 94. The female terminal contacts are slidably fitted about the connector posts 83 on the front surfaces of the end mold inserts 75, 76 to secure the interconnect wires 90, 91 to the end mold inserts 75, 76. One interconnect wire 91 includes a male pin terminal contact 96 at one end 94 thereof, in place of a female terminal contact. The male pin terminal contact 96 is received within and engages an aperture 85 formed within socket 84 mounted to the front surface of end mold insert 76 adjacent the connector posts 83 thereon.

As shown in FIG. 5, after the interconnect wires 90, 91 have been attached to the connector posts 83 and socket 84 of the end mold inserts 75, 76, the end mold inserts 75, 76 are rotated with respect to each other such that the upper surface 77 of end mold insert 76 is reoriented into a downwardly facing attitude while its lower surface 78 is reoriented into an upwardly facing attitude. As a result, the interconnect wires 90, 91 become twisted or wrapped about each other. This causes the ends of the interconnect wires 90, 91 to be reoriented into the proper alignment for connecting the two turn signals, backing lights, and brake lights of the first vehicle to the two turn signals, backing lights, and brake lights of the second vehicle when the adapter 10, 10', 10" is in use.

As illustrated in FIG. 6, after the mold inserts 75, 76 have been rotated and the interconnect wires 90, 91 twisted about one another, the end mold inserts 75, 76 are inserted into the respective end cavities 44, 46. The connector posts 83 of the end mold inserts 75, 76 are extended above intermediate mold inserts 52, 54, spaced above the upper surfaces of the end mold inserts of the intermediate mold inserts. The connector posts 83 of end mold inserts 75 extend along the longitudinal axis X, projecting into the channel 56 of intermediate mold insert 52. The connector posts 83 and socket 84 of end mold insert 76 extend toward the connector posts of the end mold insert 75 along longitudinal axis X, projecting above and parallel to the flat portion 72 formed in intermediate mold insert 54. The interconnect wires 90, 91 are extended between the connector posts of the end mold inserts along longitudinal axis X, extending across the upper surfaces of the intermediate mold inserts. The interconnect wires 90, 91 are positioned between the wire guide pins 62, 63, 64 and 66. The wire guide pins maintain the position of the interconnect wires spaced from the side walls of intermediate mold insert 53.

Once the mold inserts 75, 76 and interconnect wires 90, 91 have been positioned within the first and second end cavities 44 and 46 and intermediate cavity 49 of the mold half 40, a similar mold half (not shown), having substantially the same configuration as the described mold half 40, is positioned over the mold inserts and locked into place. Thereafter, a molten covering material is injected or poured into the mold body 41 through the injector port 67. The covering material is typically a resin, plastic, rubber, or similar polymer material received into the mold body through a supply tube 68. The covering material is urged along channel 69 and into the cavity 95 formed by the depressions and cut-out portions 56, 57, 72 of the intermediate mold inserts through outlet 71. In the preferred embodiment, the covering material is injected into the mold body at pressures of up to 15,000 pounds per square inch (psi).

At the aforementioned pressures, the flow of the molten covering material into the mold tends to force the interconnect wires towards the sides and upper surfaces of the intermediate mold inserts. The wire guide pins, however, prevent the interconnect wires from settling or engaging the side walls. The wire guide pins thus function to maintain the interconnect wires in a spaced relationship from the side walls and upper surfaces of the intermediate mold inserts. The covering material is then allowed to cool and dry and solidify about the interconnect wires, thereby forming a solid unitary adapter. Thereafter, the mold 40 is opened and the adapter removed from the mold inserts and the process repeated to form additional adapters 10, 10', 10".

Figure 7:
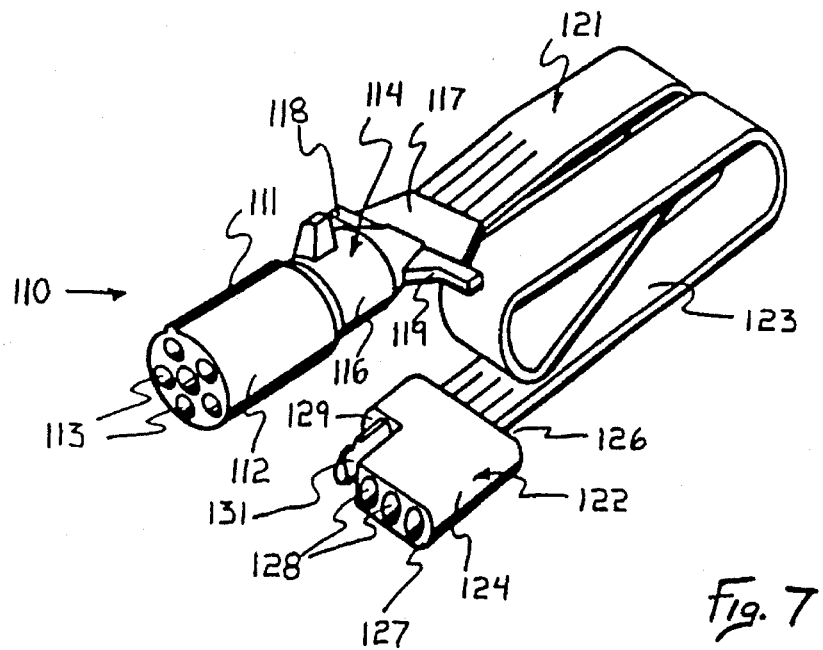
FIG. 7 is a perspective view of a fourth embodiment of an adapter in accordance with the present invention wherein an extension cord is provided.

FIG. 7 illustrates a fourth embodiment of the adapter in accordance with the present invention. The fourth embodiment is generally denoted by reference numeral 110. As shown, the adapter 110 includes an adapter body 111 having a cylindrical connector 112 at one end in which a series of female pin terminals 113 are formed. A substantially T-shaped intermediate portion 114 extends from the round terminal housing 112, tapering inwardly slightly from a first cylindrical portion 116 to a flat portion 117 having a pair of outwardly projecting flanges 118, 119 that act as finger grips for gripping and holding the adapter 110.

An extension cord 121 extends away from the flat portion 117 of the intermediate section 114 for a predetermined length and terminates in a four-way-flat harness connector 122. The extension cord comprises of a series of approximately four interconnect wires 148 (shown in FIG. 8) encased in a ribbon cable 123. The ribbon cable 123 is typically formed from a plastic or latex material that is flexible, but yet covers and protects the interconnect wires 148 contained therein from exposure to rain, dirt, etc. The four-way-flat adapter connector 122 has a flat terminal housing 124 formed from a resin, plastic, or rubber material. The material is preferably the same or similar material as the adapter body 111. The flat terminal housing 124 includes a rear end 126 to which the extension cord 121 is attached, and a front end 127 opposite the extension cord. A series of three female pin terminals 128 are formed in the front end 127 of the connector body, aligned horizontally with one another. A cut-out portion 129 is formed in the connector body adjacent the female pin terminals 128, and a male pin terminal 131 is positioned thereon.

Figure 8:
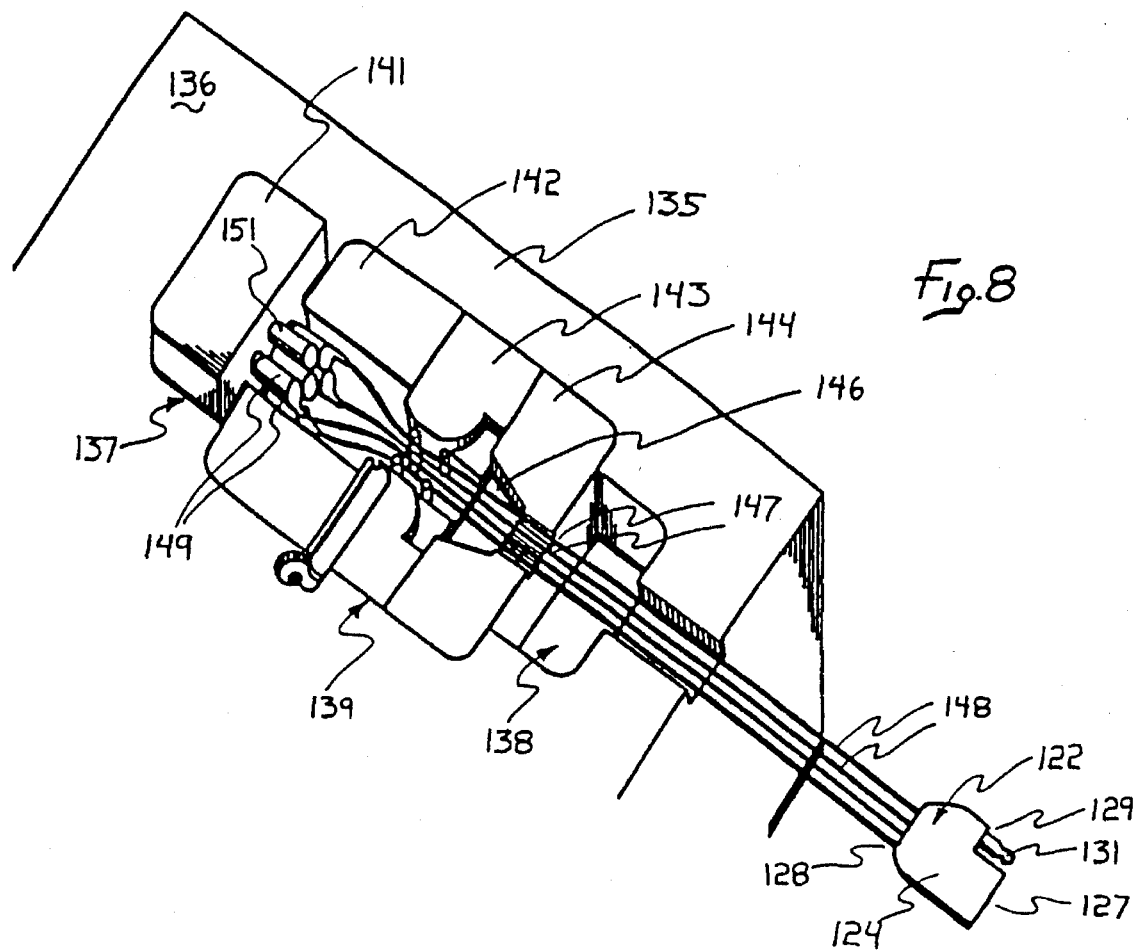
FIG. 8 is a perspective view of a second embodiment of the mold half for fabricating the fourth embodiment of the adapter of FIG. 7.

FIG. 8 illustrates a perspective view of a second embodiment of a mold half in accordance with the present invention. The adapter mold half 135 of FIG. 8 can be used to fabricate the adapter 110 of FIG. 7. In this embodiment, the adapter mold half 135 includes a mold body 136 of substantially the same construction as the mold body 41 of the mold 40 of the first embodiment in FIG. 2.

As with the first embodiment, the mold body 136 includes end cavities 137, 138 and an intermediate cavity 139. As illustrated in FIG. 8, an end mold insert 141 is received within end cavity 137 and intermediate mold inserts 142, 143, having the same construction as the respective intermediate mold inserts 52, 53 illustrated in FIG. 2, are received within the intermediate mold cavity 139. A third intermediate mold insert 144 is inserted into the intermediate mold cavity 139 adjacent intermediate mold insert 143. Intermediate mold insert 144 includes a substantially flat Y-shaped cut-out 146 formed in its upper surface and aligned with the cut-out portions formed in the upper surfaces of intermediate mold inserts 142, 143. The cut-out 146 includes a series of four grooves 147 formed in its upper surface adjacent end cavity 138. End cavity 138 is left open in the foregoing embodiment.

A series of four interconnect wires 148 are attached by terminal connectors 149 to a series of connector posts 151 arranged in a substantially circular pattern on the front surface of end mold insert 141. The interconnect wires 148 are extended along the length of the mold body 136 along longitudinal axis X, resting in the grooves 147 of intermediate mold insert 144. The interconnect wires 148 extend out of the mold body, terminating at the four-way-flat harness connector 122.

During operation and use of the adapter mold 135 for forming adapter 110, the mold inserts 141, 142, 143, 144 are positioned within the end cavity 137 and intermediate cavity 139, with end cavity 138 remaining open. A correlative mold half similar in construction to mold half 135 is placed over the mold half 135 in a sealed airtight configuration. Thereafter, a suitable covering material is introduced into the mold body, then permitted to dry and cooled to thereby form the adapter body 111. As with the first embodiment of the mold, the covering material is preferably injected under pressure into the mold, which process is well known in the art. After the foregoing process, a shrink wrap material, such as a resin, plastic, or rubber material, is applied about the interconnect wires 148 projecting from the adapter body 111 via a conventional shrink wrap process to complete the formation of the adapter 110 with extension cord 121.

Figure 9:
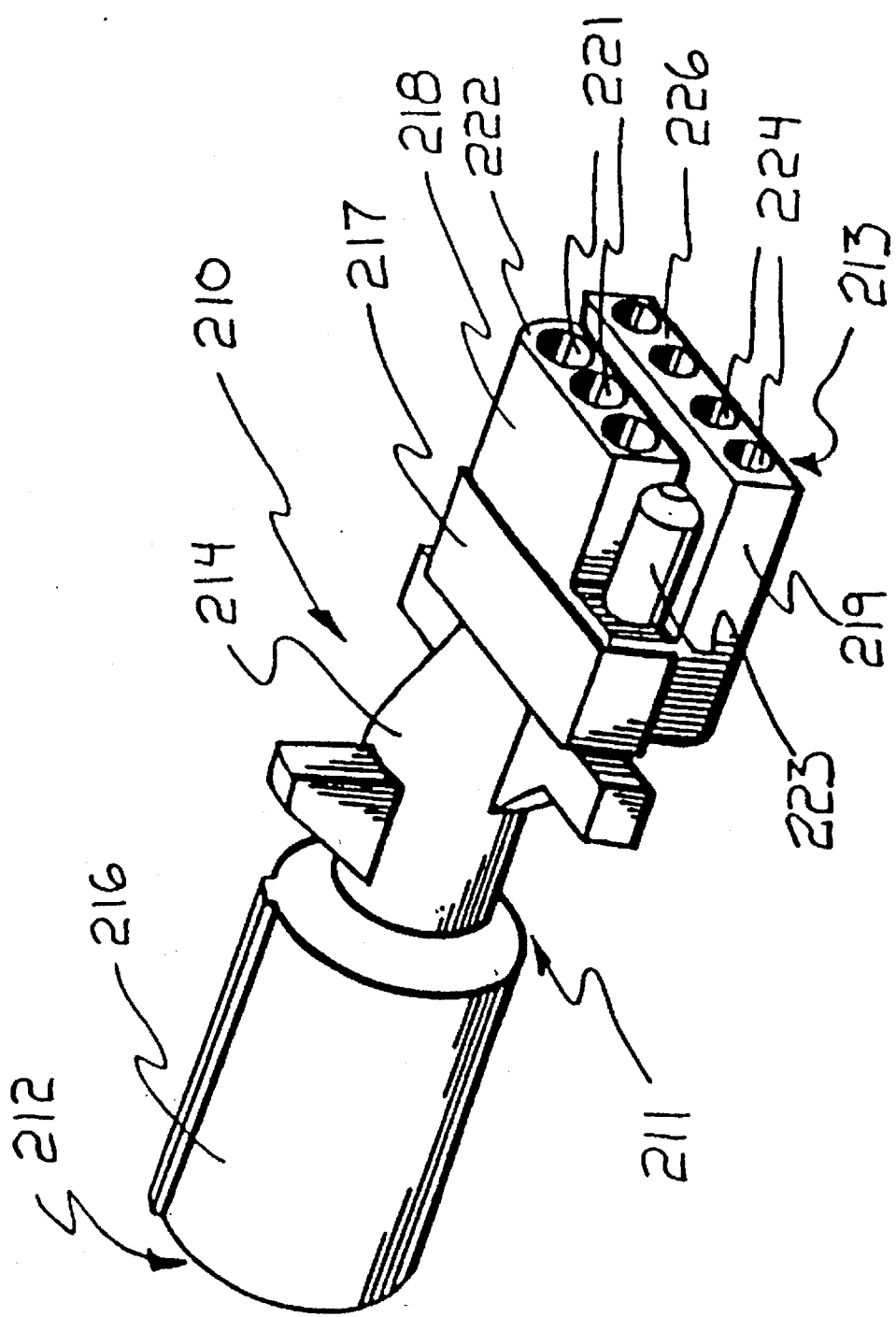
FIG. 9 is a perspective view of a fifth embodiment of an adapter in accordance with the present invention having differently tiered terminals at one end.

FIG. 9 illustrates a fifth embodiment of an adapter in accordance with the present invention, which is generally denoted by reference numeral 210. The adapter 210 includes an adapter body 211 having first and second ends 212, 213 and an intermediate portion 214 therebetween. A round terminal housing 216 is formed at the first end 212 of the adapter body 211. The round terminal housing 216 is sized and shaped to correspond to the particular harness connection which is desired (for example, the pentagon or hexagon configurations described in FIGS. 1A, 1B, or 1C.)

A flat terminal housing 217 is formed at the second end 213 of the adapter body 211. The flat terminal housing 217 is a double tiered connector having an upper tier 218 and a lower tier 219. The upper tier 218 is formed to interface with a four-way-flat harness connector having a series of three horizontally aligned female pin terminals 221 formed in a side face 222 thereof and a male pin terminal 223 positioned adjacent the female pin terminals 221. The lower tier 219 is a four-way-flat adapter connector having a series of four horizontally aligned, female pin terminals 224 formed in a side face 226 thereof. With the foregoing configuration, the adapter 210 can connect to the four-way-flat harness connectors of conventional trailers where the trailer harness connector includes three male pin terminals and a female pin terminal, or alternatively, a series of four male pin terminals.

Figure 10:
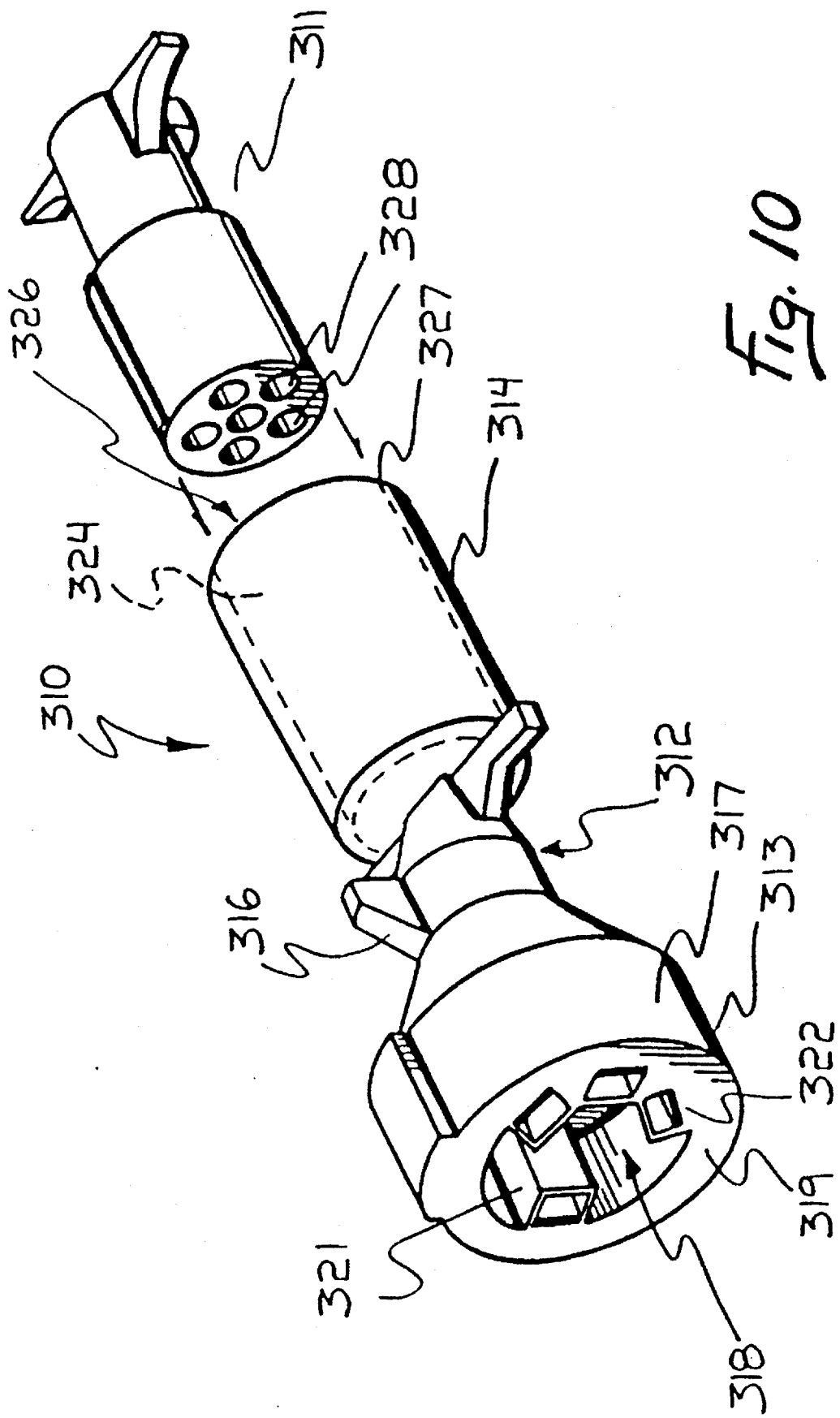
FIG. 10 is a perspective view of a sixth embodiment of an adapter in accordance with the present invention for adapting a seven-way-round harness connector to a six-way-round harness connector.

FIG. 10 illustrates still a sixth embodiment of a novel adapter in accordance with the present invention, which is generally denoted by reference numeral 310. The adapter 310 is directed to connecting a seven-way-round harness connector (not shown) having seven male blade terminals to a six-way-round harness connector 311 having six female pin terminals.

The adapter 310 includes an adapter body 312 having first and second ends 313 and 314 with an intermediate portion 316 positioned therebetween. A round terminal housing 317 is formed at the first end of the adapter body 312 and transgresses conically to the intermediate portion 316, as shown. The round terminal housing 317 is of a size and shape that corresponds approximately to a seven-way-round harness connector having seven male blade terminals. Further, the round terminal housing 317 includes an open ended cavity 318 formed in its flat side surface 319. A series of substantially rectangularly-shaped, female blade terminals 321 are formed along the side surface 319 of the cavity 318, and each include a substantially flat blade terminal contact 322 mounted therein. The female blade terminals 321 engage and mate with the male blade terminals of a seven-way-round harness connector, with the blade terminal contacts 322 engaging and forming an electrical connection with the blade terminal contacts of the seven-way-round harness connector.

The second end 314 of the adapter 310 is formed as a substantially hollow cylinder 324 having an open-ended aperture 326 formed in a free end 327. The aperture 326 is substantially cylindrically-shaped and is sized to receive the six-way-round connector 311 therein in frictional mating engagement. The aperture 326 includes a series of male pin terminals (not shown) for engagement with the female terminals 328 of the harness connector 311. Thus, the adapter 310 connects a seven-way-round harness connector of a first vehicle to the six-way-round harness connector of a second vehicle.

It will be obvious to those skilled in the art that many variations and modifications may be made to the above-described embodiments, which were chosen for the purpose of illustrating the present invention, without substantially departing from the spirit and scope of the present invention. Accordingly, all such variations and modifications are intended to be included herein within the scope of the following claims.

Wherefore, the inventor claims the following:

1. A wiring harness adapter comprising:

a unitary body having first and second ends, said first end having a shaped configuration, said configuration shaped to correspond to a particular harness connection; and said second end comprising a terminal housing, said terminal housing including a first layer having only three female pin terminals and a male pin terminal placed adjacent one of said female pin terminals and a second layer of only four female pin terminals; and wherein said terminal housing is a double-tiered connector having an upper tier and a lower tier, said upper and lower tiers placed adjacent one another wherein one of said first and second layers forms said upper tier and the other of said first and second layers forms said lower tier.

2. A wiring harness adapter as set forth in claim 1 wherein said shaped configuration of said first end includes a plurality of pin terminals;

an intermediate section, said intermediate section disposed between and interconnecting said first and second ends; and a plurality of wires, said wires connected to said plurality of pin terminals at said first end and passing through said intermediate section and connected to said female pin terminals and said male pin terminal of said first layer, said wires further connected to said female pin terminals of said second layer in said second end to form an electrical connection for interfacing between a first electrical system and a second electrical system.

\* \* \* \* \*

UNITED STATES PATENT AND TRADEMARK OFFICE
CERTIFICATE OF CORRECTION

PATENT NO. : 5,514,009
DATED : May 7, 1996
INVENTOR(S) : Michael T. Hughes

It is certified that error appears in the above-indentified patent and that said Letters Patent is hereby corrected as shown below:

Column 1, Line 43, after "pin" insert --terminals--

Column 5, Line 59, delete "10'" and insert --10"--

Column 7, Line 28, after "a" insert --substantially--

Signed and Sealed this

Twenty-seventh Day of August, 1996

Attest:

BRUCE LEHMAN

*Attesting Officer*      *Commissioner of Patents and Trademarks*